(12) United States Patent
Noda et al.

(10) Patent No.: US 7,543,043 B2
(45) Date of Patent: Jun. 2, 2009

(54) COMMUNICATION DEVICE AND METHOD

(75) Inventors: Takurou Noda, Tokyo (JP); Makoto Sato, Tokyo (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 10/470,127

(22) PCT Filed: Nov. 18, 2002

(86) PCT No.: PCT/JP02/12002

§ 371 (c)(1),
(2), (4) Date: Jul. 19, 2004

(87) PCT Pub. No.: WO03/047173

PCT Pub. Date: Jun. 5, 2003

(65) Prior Publication Data

US 2005/0015467 A1    Jan. 20, 2005

(30) Foreign Application Priority Data

Nov. 27, 2001  (JP)  ............................. 2001-360370
Sep. 17, 2002  (JP)  ............................. 2002-269952

(51) Int. Cl.
*G06F 15/177* (2006.01)
(52) U.S. Cl. ...................................... 709/220
(58) Field of Classification Search .................. 709/227, 709/220
See application file for complete search history.

(56) References Cited

U.S. PATENT DOCUMENTS 5,175,418 A * 12/1992 Tanaka .................... 235/439

(Continued)

FOREIGN PATENT DOCUMENTS

| EP | 0957615 A | 11/1999 |
| JP | 02-280292 | 11/1990 |
| JP | 2001-111543 | 4/2001 |

(Continued)

OTHER PUBLICATIONS

M2 Presswire. "Sony Corporation: Eleven Companies collaborate to promote the "Edy" prepaid electronic money service for the IT era; Convienient and secure payemnt system for both the real and the cyber world" Dec. 28, 2000.*
Office Action issued in JP 2005-267372 (2 pages).
Supplementary Search Report issued in EP 02781800.4-1249 dated Jan. 28, 2009 (3 pages).

*Primary Examiner*—Nathan J. Flynn
*Assistant Examiner*—Michael E Keefer
(74) *Attorney, Agent, or Firm*—Finnegan, Henderson, Farabow, Garrett & Dunner, L.L.P.

(57) ABSTRACT

The present invention relates to a communication apparatus and method that allow setting for forming a wireless link to be automatically executed without requiring a special setting operation. A personal computer 1 forms a wireless link with an access-point device 3 using a wireless communication unit, and exchanges data with, for example, a server (not shown) connected to a network 4, via the access-point device 3. The personal computer 1 requires an SSID and a WEP KEY defined in IEEE 802.11b to be set before forming a wireless link with the access-point device 3. The setting is executed only by placing an IC card 2 within a predetermined distance of (or momentarily in contact with) an IC-card contactless communication unit 19 of the personal computer 1. The present invention can be applied to a wireless LAN system including personal computers, PDAs, access-points, etc.

8 Claims, 14 Drawing Sheets

U.S. PATENT DOCUMENTS

| | | | | |
|---|---|---|---|---|
| 6,068,193 A | * | 5/2000 | Kreft | 235/492 |
| 2001/0023446 A1 | * | 9/2001 | Balogh | 709/229 |
| 2001/0025878 A1 | * | 10/2001 | Hendrick | 235/375 |
| 2004/0031856 A1 | * | 2/2004 | Atsmon et al. | 235/492 |
| 2005/0001711 A1 | * | 1/2005 | Doughty et al. | 340/5.74 |

FOREIGN PATENT DOCUMENTS

| | | |
|---|---|---|
| JP | 2001-156704 | 6/2001 |
| JP | 2001-189722 | 7/2001 |
| JP | 2002-351766 | 12/2002 |

* cited by examiner

```
<accessPoint>
    <title>local-net</title>
    <802.11b>
            <essid> **** </essid>
            <wepkey>#####</wepkey>
    </802.11b>
</accessPoint>
```

FIG. 6

```
<accessPoint>
        <title>local-net</title>
        <802.11b>
                <essid> **** </essid>
                <wepkey>####</wepkey>
                <user>ABC</user>
                <password>ABC123</password>
        </802.11b>
</accessPoint>
```

```
<localNetwork>
        <title>local-net</title>
        <802.11b>
                <essid>****</essid>
                <wepkey>#####</wepkey>
        </802.11b>
</localNetwork>
```

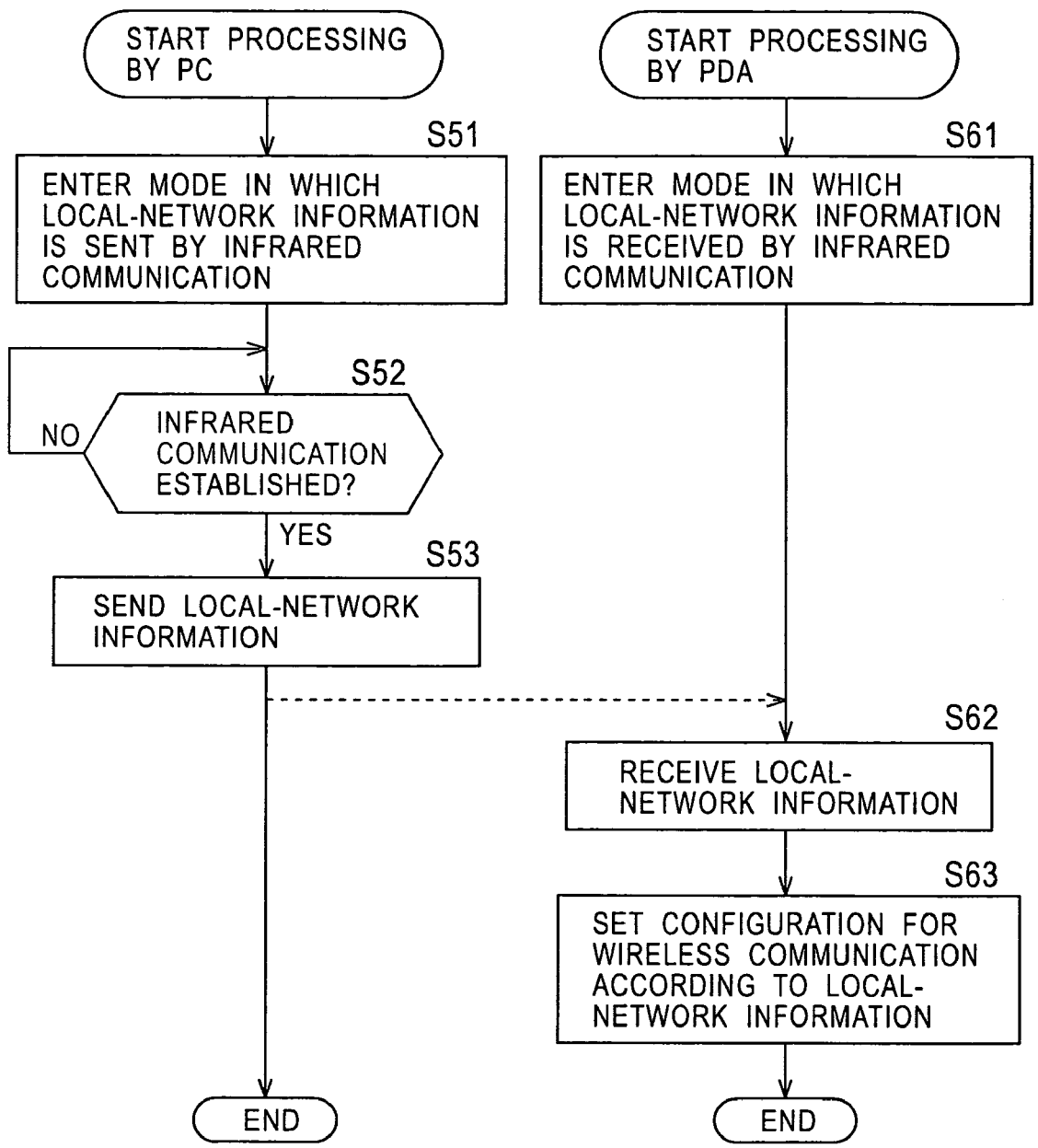

COMMUNICATION DEVICE AND METHOD

TECHNICAL FIELD

The present invention relates to communication apparatuses and methods, for example, a communication apparatus and method that are suitable for use in forming a wireless link with another electronic apparatus and carrying out data communication therewith.

BACKGROUND ART

IEEE (Institute of Electrical and Electronics Engineers) 802.11b and Bluetooth™ are known as techniques for forming wireless links among a plurality of apparatuses. In this specification, a wireless link and a wireless communication refer to those that use radio waves.

IEEE 802.11b is used to form a wireless LAN (local area network) by forming wireless links among, for example, a plurality of personal computers, access-point devices, etc.

Bluetooth is used, for example, to exchange specified data (control-command data, text data, still-picture data, moving-picture data, audio data, etc.) between personal computers, PDAs (personal digital assistants), cellular phones, digital video cameras, etc.

When a wireless LAN is to be formed using the wireless link techniques described above, in which only desired ones of a plurality of nearby electronic apparatuses capable of forming wireless links are to be linked, in order to inhibit an unintended electronic apparatus from getting linked with the wireless LAN, according to one method, ID information, passwords, etc. are set in advance to electronic apparatuses that are to be linked to the wireless LAN.

However, it has been laborious for a user to set network configuration by entering ID information and a password to an electronic apparatus for which a wireless link is to be formed.

Furthermore, setting network configuration is difficult for a user not familiar with operating the electronic apparatus for which a wireless link is to be formed, and is not considered to be an operation that can be readily performed by anyone.

Furthermore, since the ID information and password themselves are usually meaningless sequences of characters and digits, errors could occur when the user manually enters the ID information and password.

DISCLOSURE OF INVENTION

The present invention has been made in view of the situation described above, and an object thereof is to allow setting for a wireless link to be automatically executed without a user performing a laborious setting operation.

A first communication apparatus according to the present invention includes wireless communication means for carrying out wireless communication with another electronic apparatus based on a predetermined wireless communication standard; detection means for detecting presence of an information recording medium having recorded thereon setting information that is required for forming a wireless link with the another electronic apparatus; reading means for reading the setting information, by contactless communication, from the information recording medium detected by the detection means; and setting means for adjusting setting of the wireless communication means according to the setting information read by the reading means.

The predetermined wireless communication standard may be IEEE 802.11b.

The predetermined wireless communication standard may be the Bluetooth™ wireless communication standard.

The contactless communication may be carried out using a FeliCa™ System.

The information recording medium may be an IC card.

The setting information may include at least one of ID information, a password associated with the ID information, a user name, and a password associated with the user name.

The first communication apparatus according to the present invention may further include recording means for recording, by the contactless communication, setting information that is required for forming a wireless link with the communication apparatus on the information recording medium detected by the detection means.

A first communication method according to the present invention includes a wireless communication step of carrying out wireless communication with another electronic apparatus based on a predetermined wireless communication standard; a detection step of detecting presence of an information recording medium having recorded thereon setting information that is required for forming a wireless link with the another electronic apparatus; a reading step of reading the setting information, by contactless communication, from the information recording medium detected by processing in the detection step; and a setting step of adjusting setting of processing in the wireless communication step based on the setting information read by processing in the reading step.

A program on a first recording medium according to the present invention includes a wireless communication step of carrying out wireless communication with another electronic apparatus based on a predetermined wireless communication standard; a detection step of detecting presence of an information recording medium having recorded thereon setting information that is required for forming a wireless link with the another electronic apparatus; a reading step of reading the setting information, by contactless communication, from the information recording medium detected by processing in the detection step; and a setting step of adjusting setting of processing in the wireless communication step based on the setting information read by processing in the reading step.

A first program according to the present invention includes a wireless communication step of carrying out wireless communication with another electronic apparatus based on a predetermined wireless communication standard; a detection step of detecting presence of an information recording medium having recorded thereon setting information that is required for forming a wireless link with the another electronic apparatus; a reading step of reading the setting information, by contactless communication, from the information recording medium detected by processing in the detection step; and a setting step of adjusting setting of processing in the wireless communication step based on the setting information read by processing in the reading step.

A second communication apparatus according to the present invention includes first communication means for carrying out wireless communication with another electronic apparatus based on a predetermined wireless communication standard; second communication means for receiving setting information that is required for forming a wireless link with the another electronic apparatus from the another electronic apparatus; and setting means for adjusting setting of the first communication means according to the setting information received by the second communication means.

The predetermined wireless communication standard may be IEEE 802.11b.

The predetermined wireless communication standard may be the Bluetooth™ wireless communication standard.

The second communication means may be contactless communication.

The second communication means may be infrared communication.

The setting information may include at least one of ID information, a password associated with the ID information, a user name, and a password associated with the user name.

The second communication means may send setting information that is required for forming a wireless link with the communication apparatus to the another electronic apparatus.

A second communication method according to the present invention includes a first communication step of carrying out wireless communication with another electronic apparatus based on a predetermined wireless communication standard; a second communication step of receiving setting information that is required for forming a wireless link with the another electronic apparatus from the another electronic apparatus; and a setting step of adjusting setting of processing in the first communication step according to the setting information received by processing in the second communication step.

A program on a second recording medium according to the present invention includes a first communication step of carrying out wireless communication with another electronic apparatus based on a predetermined wireless communication standard; a second communication step of receiving setting information that is required for forming a wireless link with the another electronic apparatus from the another electronic apparatus; and a setting step of adjusting setting of processing in the first communication step according to the setting information received by processing in the second communication step.

A second program according to the present invention includes a first communication step of carrying out wireless communication with another electronic apparatus based on a predetermined wireless communication standard; a second communication step of receiving setting information that is required for forming a wireless link with the another electronic apparatus from the another electronic apparatus; and a setting step of adjusting setting of processing in the first communication step according to the setting information received by processing in the second communication step.

According to the first communication apparatus and method, and program, presence of an information recording medium having recorded thereon setting information that is required for forming a wireless link with another electronic apparatus is detected, the setting information is read, by contactless communication, from the information recording medium detected, and setting of processing for wireless communication is adjusted.

According to the second communication apparatus and method, and program, setting information that is required for forming a wireless link with another electronic apparatus is received from the another electronic apparatus, and setting of wireless communication with the another electronic apparatus based on a predetermined communication standard is adjusted according to the setting information received.

BRIEF DESCRIPTION OF THE DRAWINGS

FIG. 6 is a diagram showing an example where user information is added to the access-point information shown in FIG. 3.

FIG. 16 is a flowchart showing processing for forming a wireless LAN between the personal computer 1 and the PDA 71 in ad-hoc mode by infrared communication without using the IC card 2.

BEST MODE FOR CARRYING OUT THE INVENTION

Figure 1:
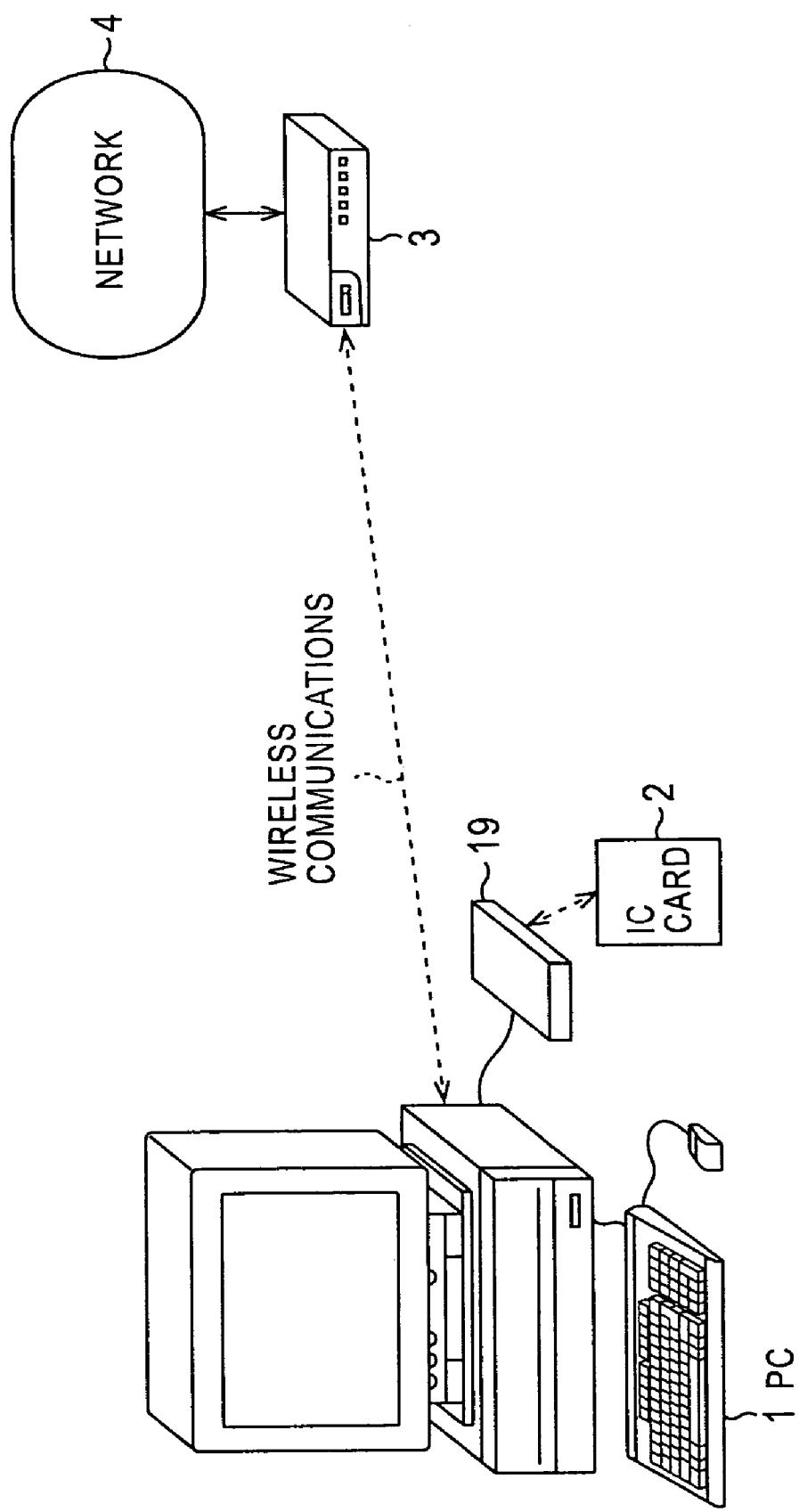
FIG. 1 is a diagram showing a scheme of executing setting of a wireless link between a personal computer 1 and an access-point device 3 using an IC card.

FIG. 1 shows a scheme of a wireless link formed between a personal computer 1 and an access-point device 3 according to an embodiment of the present invention.

The personal computer 1 forms a wireless link with the access-point device 3 by a wireless communication function conforming to IEEE 802.11b, and exchanges data with, for example, a server (not shown) connected to a network 4 such as the Internet.

Before forming a wireless link with the access-point device 3, however, ID information SSID and a password WEP KEY defined in IEEE 802.11b (hereinafter referred to as access-point information) must be set in a wireless communication unit of the personal computer 1.

Access-point information can be set only by placing an IC card 2 having the access-point information recorded thereon within a predetermined distance of (or momentarily in contact with) an IC-card contactless communication unit 19 of the personal computer 1.

Figure 2:
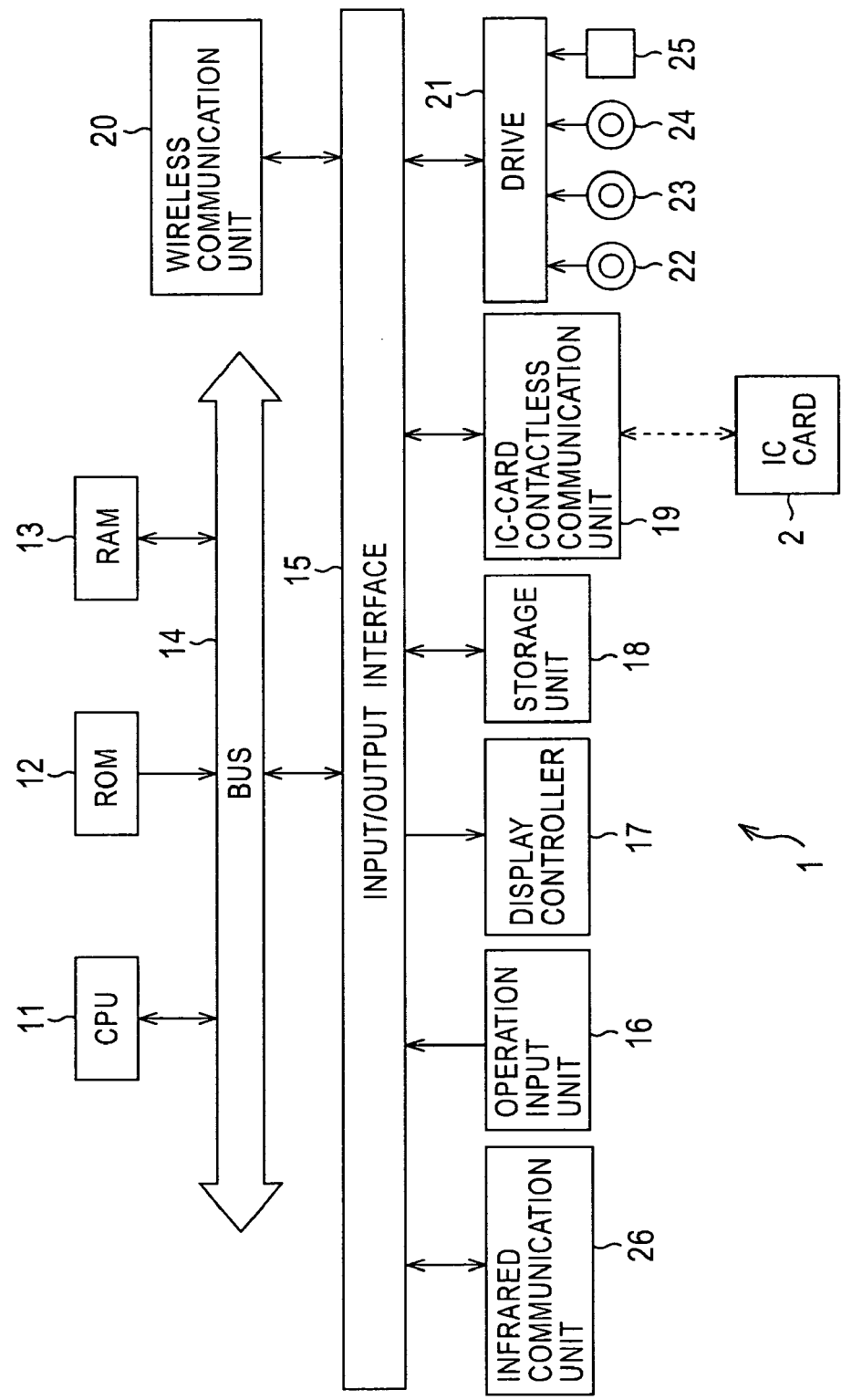
FIG. 2 is a block diagram showing an example configuration of the personal computer 1 shown in FIG. 1.

FIG. 2 shows an example configuration of the personal computer (PC) 1. The personal computer 1 includes a CPU (central processing unit) 11. The CPU 11 is connected to an input/output interface 15 via a bus 14. Furthermore, a ROM (read only memory) 12 and a RAM (random access memory) 13 are connected to the bus 14.

The input/output interface 15 is connected to an operation input unit 16 including input devices such as a keyboard and a mouse for allowing a user to input operation commands, a display controller 17 for outputting an image signal to a CRT (cathode-ray tube) display, an LCD (liquid crystal display), or the like for displaying an operation screen, a storage unit 18 such as a hard disk drive for storing programs and various data, an IC-card contactless communication unit 19 for detecting the IC card 2 when it is placed in close proximity thereto and reading data from and writing data to the IC card 2, a wireless communication unit 20 for forming a wireless link and exchanging data with, for example, the access-point device 3 by a wireless communication function conforming to IEEE 802.11b, according to access-point information, local-network information, or the like that is set by the CPU 11, and to a drive 21 for reading data from and writing data to a recording medium such as a magnetic disc 22 (including a flexible disc), an optical disc 23 (including a CD-ROM (compact disc-read only memory) and a DVD (digital versatile disc)), a magneto-optical disc 24 (including an MD (mini disc)), or a semiconductor memory 25.

Furthermore, the input/output interface 15 is connected to an infrared communication unit 26 for exchanging local-network information, etc. with other electronic apparatuses (e.g., a PDA 71 shown in FIG. 14) using infrared signals. An optical transmitter and an optical receiver of the infrared communication unit 26 are provided outside the case of the personal computer 1.

The CPU 11 controls each of the components according to programs that are stored in the ROM 12 or that are read from the magnetic disc 22 to the semiconductor memory 25 and stored in the storage unit 18 and then loaded from the storage unit 18 into the RAM 13, thereby executing various processes.

The IC-card contactless communication unit 19 may be provided outside the case of the personal computer 1, as shown in FIG. 1, or inside the case, for example, on a side face thereof. Data can be read from and written to the IC card 2 in a contactless manner using, for example, a FeliCa system.

Furthermore, the IC-card contactless communication unit 19 is capable of exchanging local-network information, etc. with a contactless communication unit 59 of a PDA 41 (FIG. 12) when it is placed in close proximity thereto.

Referring back to FIG. 1, the IC card 2 is sold together with, for example, the access-point device 3, and access-point information for forming a link with the access-point device 3 is pre-recorded in the IC card 2.

Figures 3, 4:
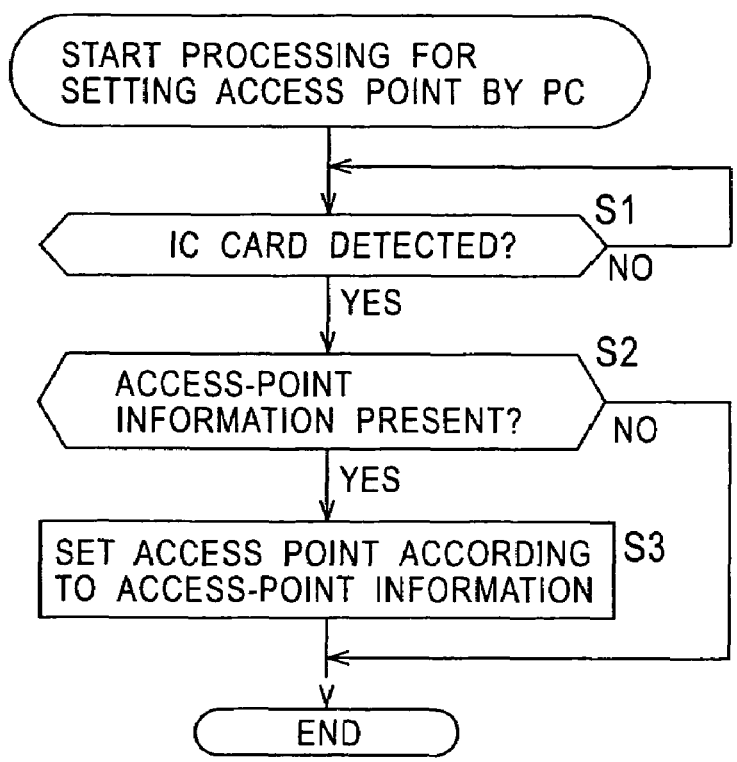
FIG. 3 is a diagram showing an example of access-point information pre-recorded in the IC card shown in FIG. 2.
FIG. 4 is a flowchart showing processing for setting an access point, executed by the personal computer 1.

FIG. 3 shows an example of the access-point information pre-recorded in the IC card 2, written in XML (Extensible Markup Language). In the figure, "**" indicates ID information SSID, and "####" indicates a password Wep key. Usually, "**" and "####" are meaningless sequences of characters and digits.

The access-point device 3 is capable of carrying out wireless communications according to IEEE 802.11b with the wireless communication unit 20 included in the personal computer 1. The access-point device 3 relays data communications between the personal computer 1 and, for example, a server on the network 4.

The access-point device 3 can be wirelessly linked simultaneously with, in addition to the personal computer 1, a plurality of personal computers equivalent to the personal computer 1 (not shown, hereinafter referred to as personal computers 1'). In that case, the access-point device 3 also relays data communications between the personal computer 1 and the personal computers 1'.

Next, processing for setting an access-point, executed by the personal computer 1, will be described with reference to a flowchart shown in FIG. 4. In step S1, the IC-card contactless communication unit 19 starts detection of the IC card 2, and waits until the IC card 2 is detected.

At this time, when the user places the IC card 2 in proximity to the IC-card contactless communication unit 19 of the personal computer 1, the IC-card contactless communication unit 19 detects the IC card 2, and the processing proceeds to step S2.

In step S2, the IC-card contactless communication unit 19 determines whether access-point information is recorded in the IC card 2 detected. If it is determined that access-point information is recorded in the IC card 2 detected, the processing proceeds to step S3.

In step S3, the IC-card contactless communication unit 19 reads the access-point information recorded in the IC card 2. The CPU 11 sets configuration of the wireless communication unit 20 according to the access-point information read by the IC-card contactless communication unit 19. Thus, the personal computer 1 establishes a wireless link with the access-point device 3, and is allowed to access, for example, a server on the network 4 via the access-point device 3.

If it is determined in step S2 that access-point information is not recorded in the IC card 2 detected, step S3 is skipped, and the processing is exited. In that case, a wireless link is not established between the personal computer 1 and the access-point device 3. This concludes description of the processing for setting an access-point, executed by the personal computer 1.

Figure 5:
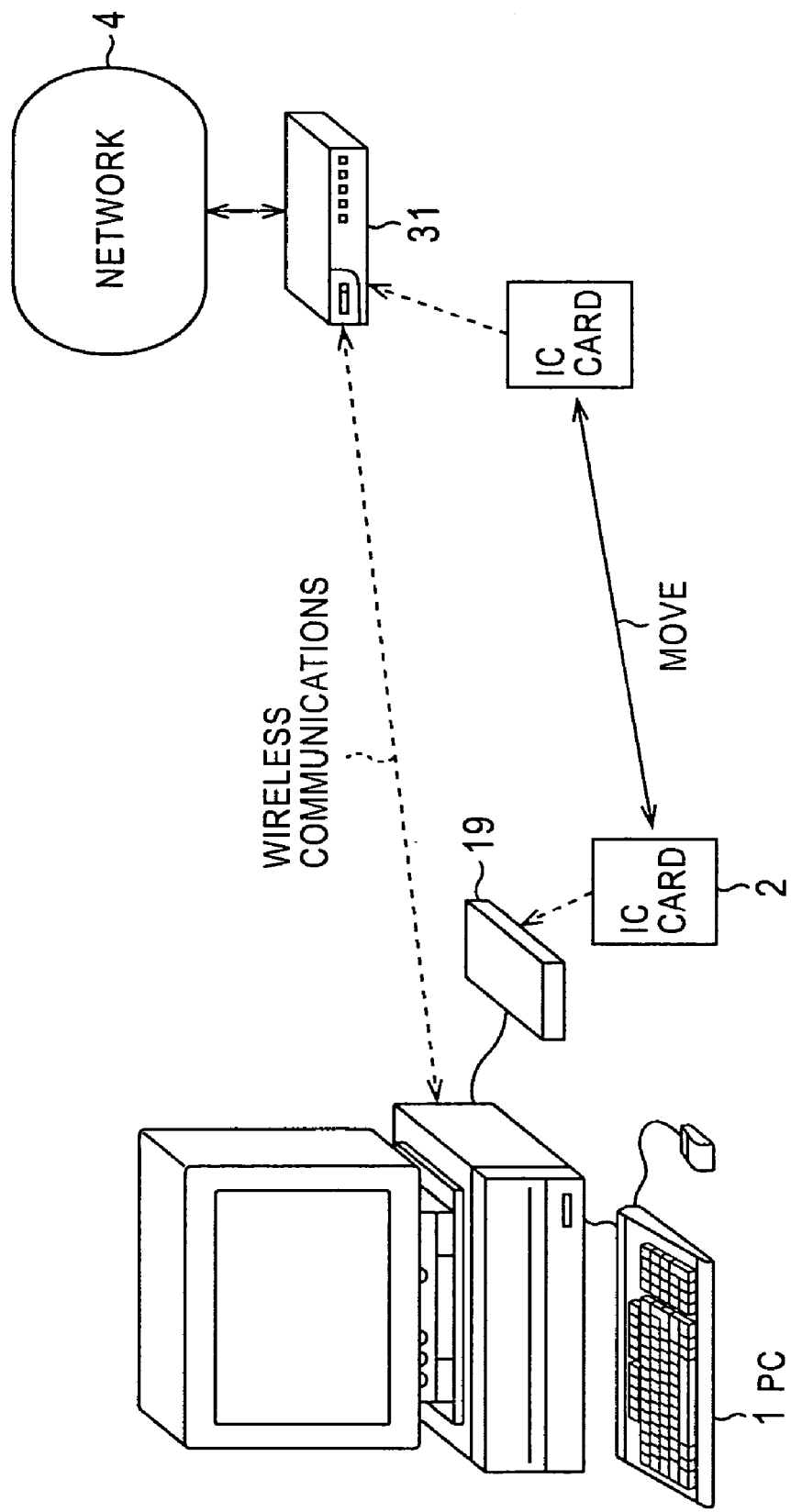
FIG. 5 is a diagram showing a scheme of executing setting of a wireless link between the personal computer 1 and an access-point device 31 using an IC card.

FIG. 5 shows a scheme of a wireless link formed between the personal computer 1 and an access-point device 31 that is capable of reading data from and writing data to the IC card 2.

The access-point device 31, as compared with the access-point device 3 shown in FIG. 1, additionally has a function equivalent to that of the IC-card contactless communication unit 19 of the personal computer 1.

Since the access-point device 31 is capable of writing data to the IC card 2, by using the access-point device 31, in the IC card 2 having already recorded access-point information thereon, it is possible to additionally record user information for forming a link with a wireless LAN that is formed via the access-point device 31 (e.g., a user name that is set for a user of the personal computer 1, a password associated with the user name, etc.).

FIG. 6 shows an example where user information is added to the access-point information written in XML, shown in FIG. 3. In the figure, "ABC" indicates a user name that is set to the personal computer 1, and "ABC123" indicates a password associated with the user name.

The user information to be recorded additionally in the IC card 2 can be input, for example, from another personal computer (not shown) that has already been linked to the access-point device 31.

By placing the IC card having the user information additionally recorded thereon in proximity to the IC-card contactless communication unit 19 of the personal computer 1 as described above, the personal computer 1 is allowed to carry out wireless communications with the access-point device 31 using the access-point information recorded in the IC card 2, and is also allowed to form a link with a wireless LAN that is formed via the access-point device 31, using the user information recorded in the IC card 2.

However, if the user name set to the personal computer 1 and the password associated with the user name are recorded in the IC card 2, as shown in FIG. 6, when the IC card 2 is placed in proximity to another personal computer 1' that is equivalent to the personal computer 1, "ABC" is set as a user name of the personal computer 1' and the personal computer 1' becomes linked with the wireless LAN.

In order to avoid this situation, alternatively, of the user information, the password ("ABC123" in the example shown in FIG. 6) may be held at the personal computer 1 instead of recording it on the IC card 2. In that case, the password held is read and set when the IC-card contactless communication unit 19 detects the IC card 2 in which the user name "ABC" that is set to the personal computer 1 is recorded as user information.

Figure 7:
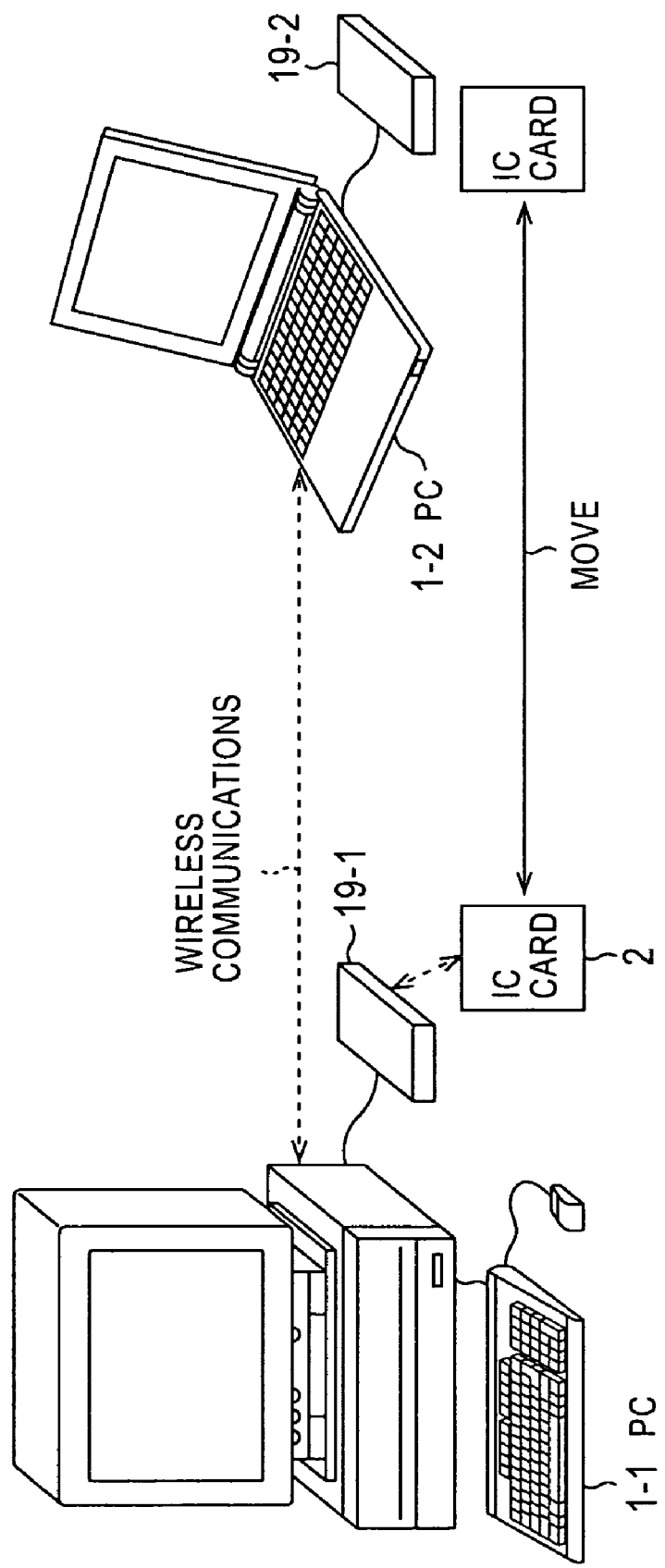
FIG. 7 is a diagram showing a scheme of forming a wireless LAN between a personal computer 1-1 and a personal computer 1-2 in ad-hoc mode.

FIG. 7 shows a scheme of processing for forming a wireless LAN in ad-hoc mode between a personal computer 1-1 and a personal computer 1-2.

The personal computers 1-1 and 1-2 are configured identically to the personal computer 1. The CPU of the personal computer 1-1 will be referred to as a CPU 11-1, and the CPU of the personal computer 1-2 will be referred to as a CPU 11-2. Other components will be similarly referred to.

Figure 8:
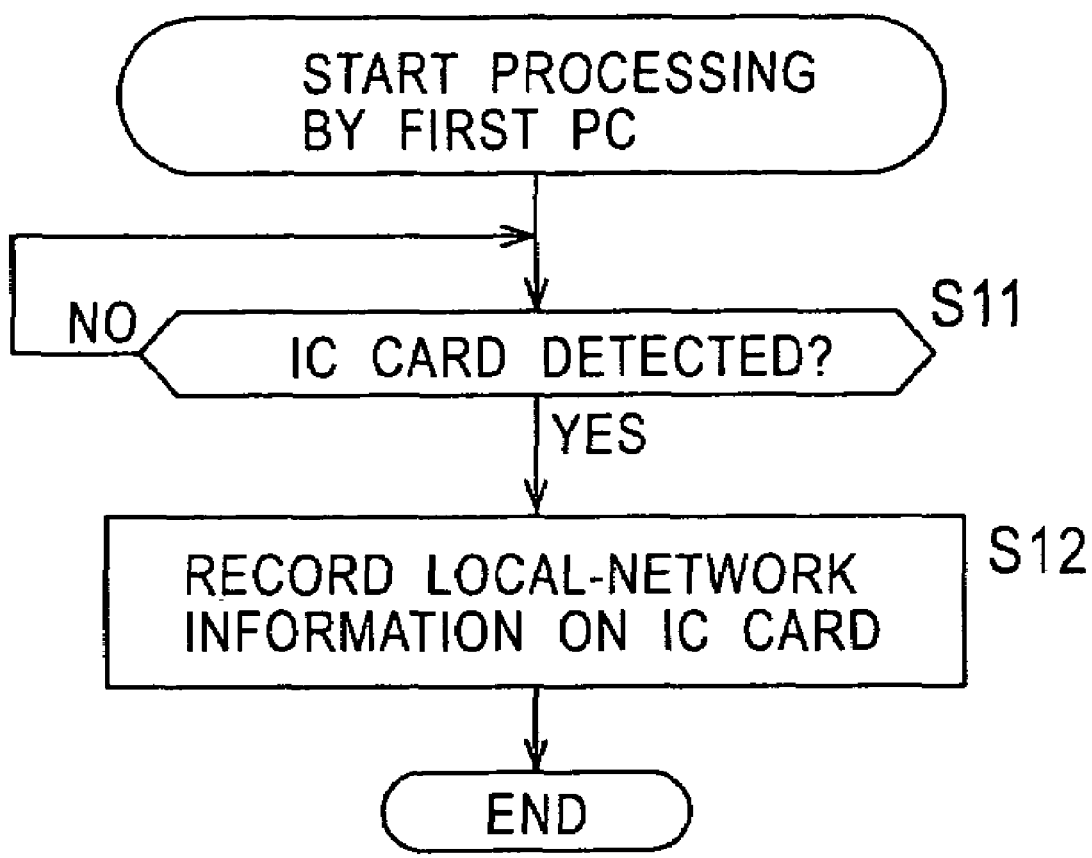
FIG. 8 is a flowchart showing processing for forming a wireless LAN in ad-hoc mode, executed by the personal computer 1-1.
Figures 9, 10:
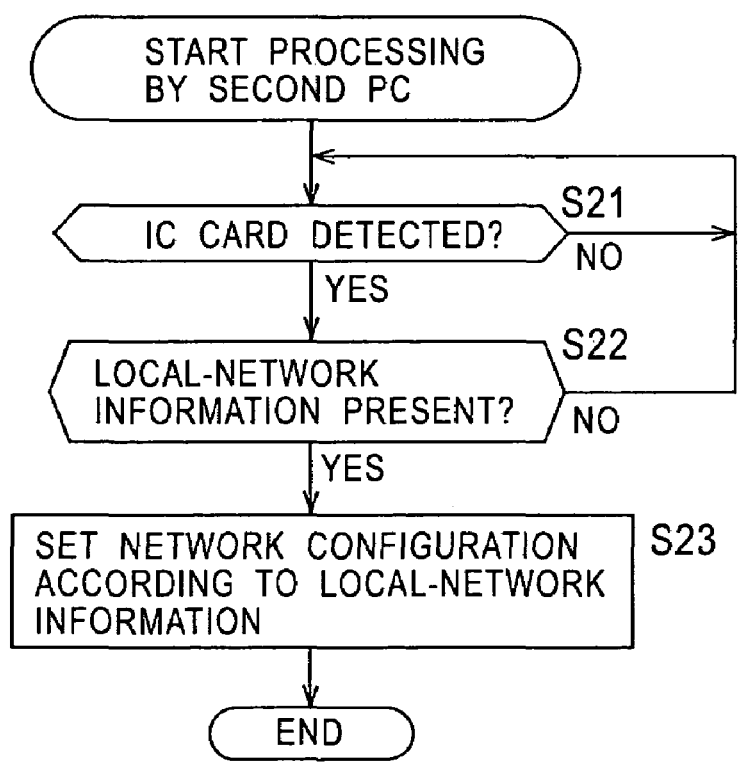
FIG. 9 is a diagram showing an example of local-network information recorded in an IC card 2.
FIG. 10 is a flowchart showing processing for forming a wireless LAN in ad-hoc mode, executed by the personal computer 1-2.

The processing for forming a wireless LAN in ad-hoc mode, executed by the personal computers 1-1 and 1-2, will be described with reference to FIGS. 8 to 10. FIG. 8 is a flowchart showing processing executed by the personal computer 1-1, and FIG. 10 is a flowchart showing processing executed by the personal computer 1-2.

The personal computer 1-1 starts processing when a user performs an operation for requesting that local-network information required for the personal computer 1-2 to form a wireless link with the personal computer 1-1 be recorded in the IC card 2.

In step S11, the IC-card contactless communication unit 19-1 of the personal computer 1-1 starts detection of the IC card 2, and waits until the IC card 2 is detected.

At this time, when the user places the IC card 2 in proximity to the IC-card contactless communication unit 19-1 of the personal computer 1-1, the IC-card contactless communication unit 19-1 detects the IC card 2, and the processing proceeds to step S12. In step S12, the IC-card contactless communication unit 19-1 records the local-network information required for the personal computer 1-2 to form a wireless link with the personal computer 1-1 in the IC card 2.

FIG. 9 shows an example of the local-network information recorded by the IC-card contactless communication unit 19-1 in the IC card 2, written in XML. In the figure, "****" indicates ID information SSID, and "####" indicates a password Wep key.

Next, processing executed by the personal computer 1-2 will be described. The processing is started when the user performs an operation for requesting that configuration of the wireless communication unit 20 be set based on the local-network information recorded in the IC card 2.

In step S21, the IC-card contactless communication unit 19-2 of the personal computer 1-2 starts detection of the IC card 2, and waits until the IC card 2 is detected.

At this time, when the user places the IC card 2 in proximity to the IC-card contactless communication unit 19-2 of the personal computer 1-2, the IC-card contactless communication unit 19-2 detects the IC card 2, and the processing proceeds to step S22. In step S22, the IC-card contactless communication unit 19-2 determines whether local-network information is recorded in the IC card 2 detected. If it is determined that local-network information is recorded in the IC card 2, the processing proceeds to step S23.

In step S23, the IC-card contactless communication unit 19-2 reads the local-network information recorded in the IC card 2. The CPU 11-2 sets network configuration of the wireless communication unit 20-2 according to the local-network information read by the IC-card contactless communication unit 19-2. Thus, a wireless LAN is formed between the personal computer 1-1 and the personal computer 1-2 in ad-hoc mode.

This concludes description of the processing for forming a wireless LAN in ad-hoc mode, executed by the personal computer 1-1 and the personal computer 1-2. Obviously, it may be such that the processing described above as executed by the personal computer 1-1 is executed by the personal computer 1-2 and that the processing described above as executed by the personal computer 1-2 is executed by the personal computer 1-1.

Figure 11:
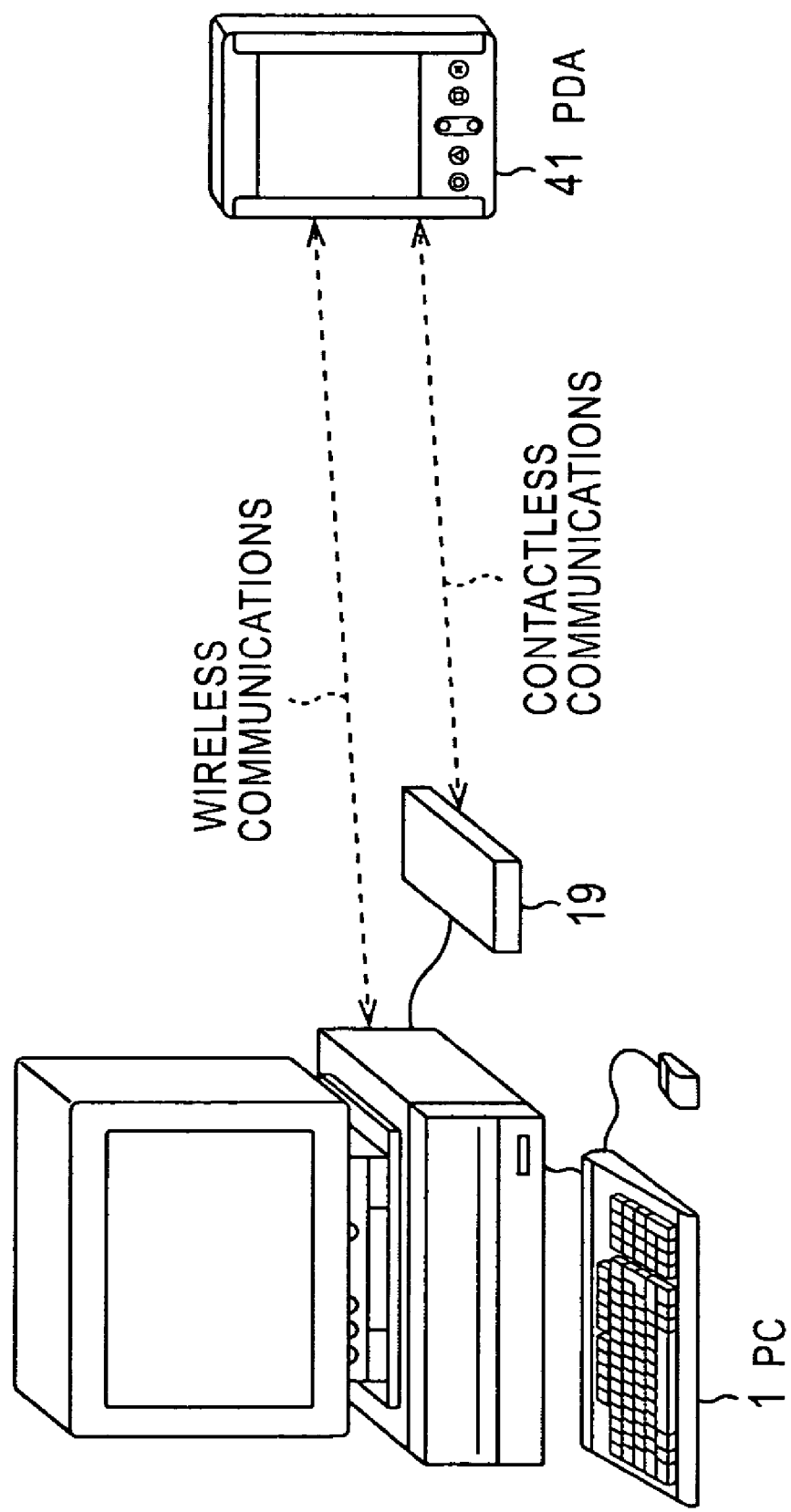
FIG. 11 is a diagram showing a scheme of forming a wireless LAN between the personal computer 1 and a PDA 41 in ad-hoc mode by contactless communication without using the IC card 2.

FIG. 11 shows a scheme of a wireless LAN that is formed in ad-hoc mode by contactless communication between the personal computer 1 and a PDA 41 without using the IC card 2. More specifically, when the PDA 41 is placed in proximity to the personal computer 1, contactless communication is established, and local-network information is exchanged, whereby configuration for wireless communication is set.

Figure 12:
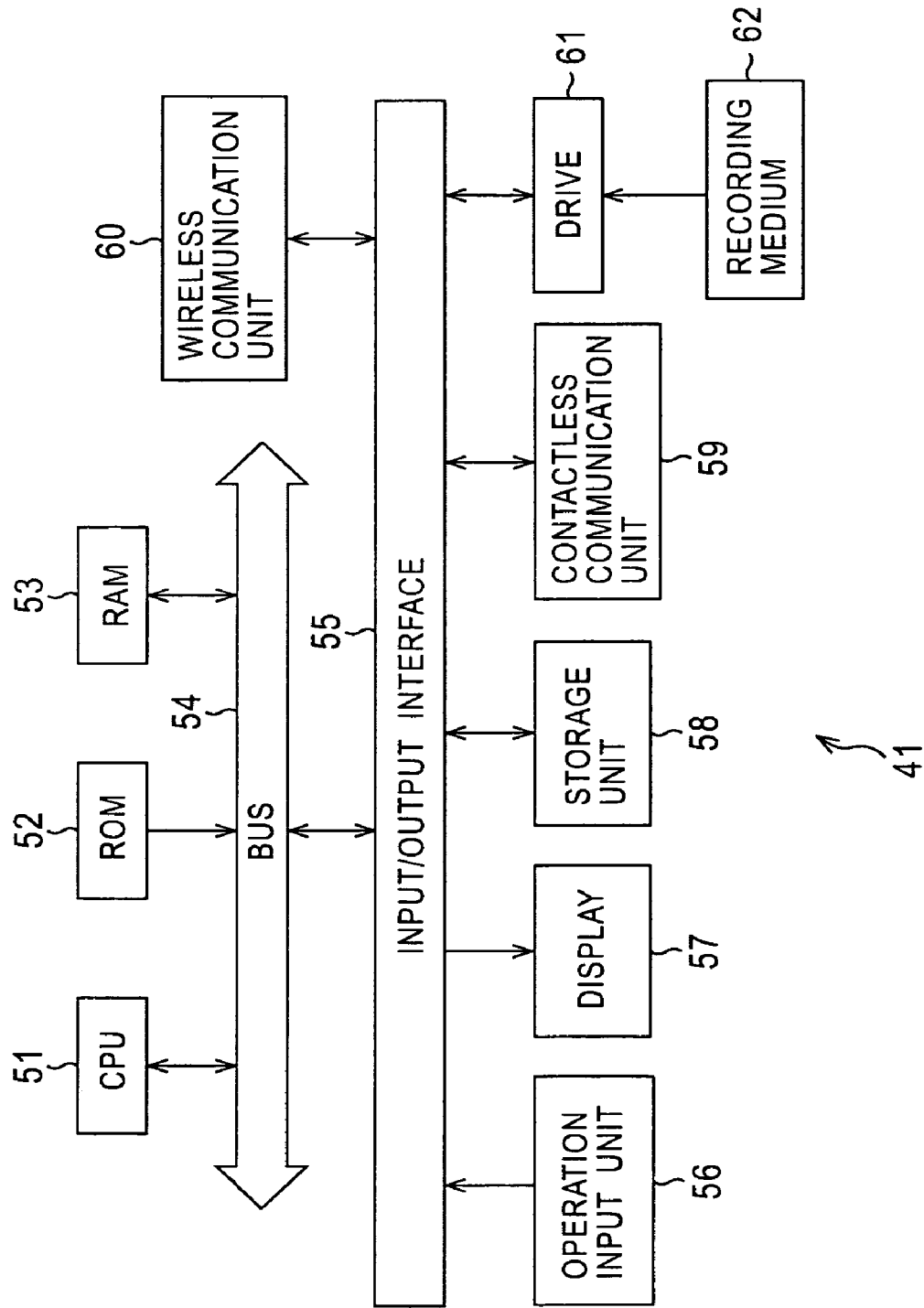
FIG. 12 is a block diagram showing an example configuration of the PDA 41 shown in FIG. 11.

FIG. 12 shows an example configuration of the PDA 41. The PDA 41 includes a CPU 51. The CPU 51 is connected to an input/output interface 55 via a bus 54. Furthermore, a ROM 52 and a RAM 53 are connected to the bus 54.

The input/output interface 15 is connected to an operation input unit 56 for allowing a user to input operation commands, a display 57 for showing an operation screen, a storage unit 58 for storing programs and various data, a contactless communication unit 59 for exchanging local-network information, etc. in a contactless manner with the IC-card contactless communication unit 19 of the personal computer 1 when it is placed in proximity, a wireless communication unit 60 for forming a wireless link and exchanging data with the wireless communication unit 20 of the personal computer 1 by a wireless communication function conforming to IEEE 802.11b, according to local-network information, etc. that is set by the CPU 51, and to a drive 61 for reading data from and writing data to a recording medium 62.

The CPU 51 controls each of the components according to programs that are stored in the ROM 52 or programs that are read from the recording medium 62 and stored in the storage unit 58 and then loaded from the storage unit 58 into the RAM 53, thereby executing various processes.

Figure 13:
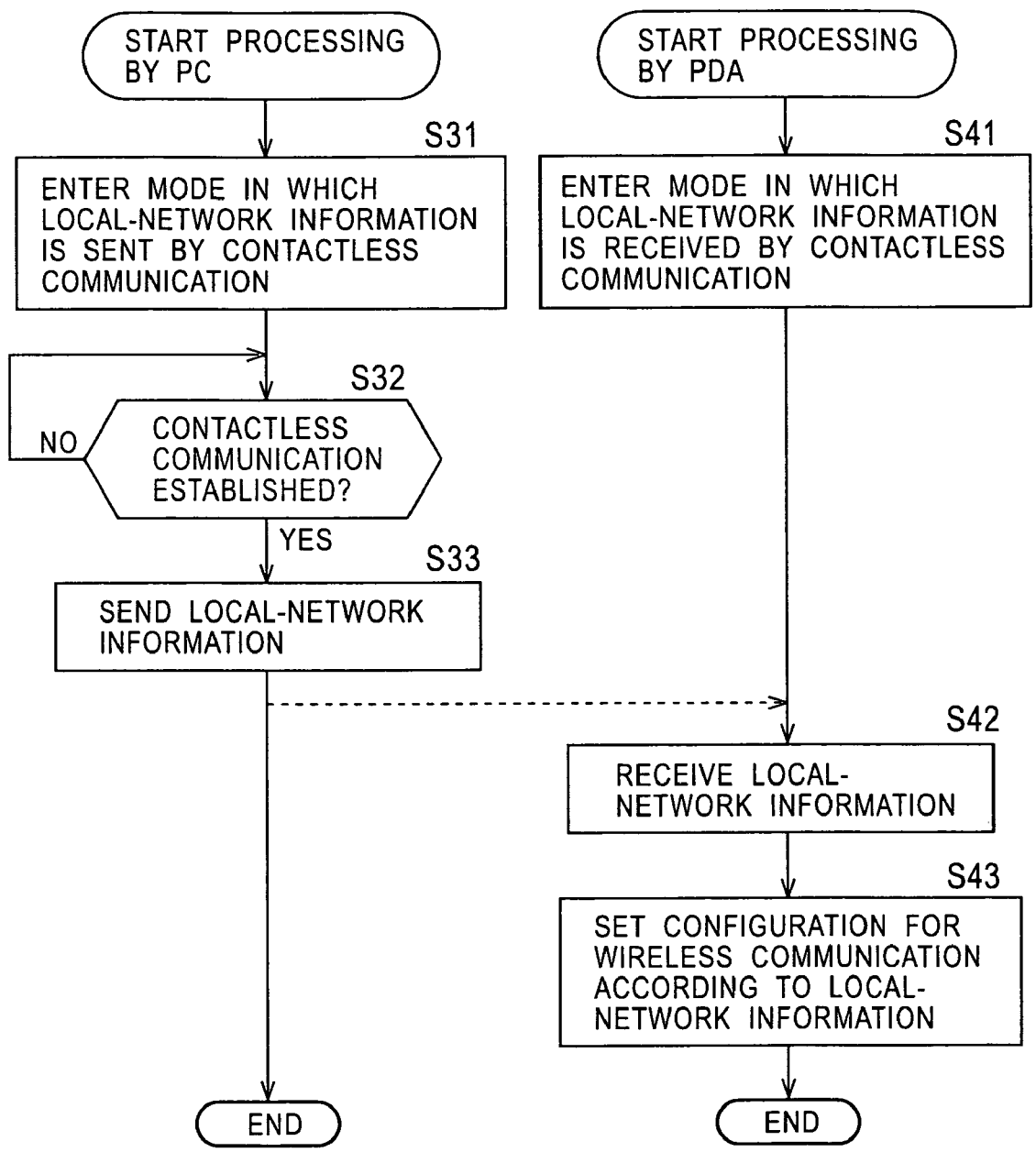
FIG. 13 is a flowchart showing processing for forming a wireless LAN between the personal computer 1 and the PDA 41 in ad-hoc mode by contactless communication without using the IC card 2.

Processing for forming a wireless LAN in ad-hoc mode by contactless communication without using the IC card 2, executed by the personal computer 1 and the PDA 41, will be described with reference to FIG. 13.

In step S31, the IC-card contactless communication unit 19 of the personal computer 1, under the control of the CPU 11 based on an operation performed by the user, enters a mode for sending local-network information by contactless communication.

Meanwhile, the contactless communication unit 59 of the PDA 41, in step S41, under the control of the CPU 51 based on an operation performed by the user, enters a mode for receiving local-network information by contactless communication.

In step S32, the IC-card contactless communication unit 19 of the personal computer 1 starts detection of the contactless communication unit 59 of the PDA 41, and waits until the contactless communication unit 59 is detected and contactless communication is established.

At this time, when the user places the PDA 41 in proximity to the IC-card contactless communication unit 19 of the personal computer 1, the contactless communication unit 59 of the PDA 41 is detected and wireless communication is established, and the processing proceeds to step S33.

In step S33, the IC-card contactless communication unit 19 sends local-network information required for forming a wireless link with the contactless communication unit 59 of the PDA 41.

In step S42, the contactless communication unit 59 of the PDA 41 receives the local-network information sent by the IC-card contactless communication unit 19. In step S43, the CPU 51 sets network configuration of the wireless communication unit 60 according to the local-network information received by the contactless communication unit 59. Thus, a wireless LAN is formed between the personal computer 1 and the PDA 41 in ad-hoc mode.

This concludes description of the processing for forming a wireless LAN in ad-hoc mode by contactless communication without using the IC card 2, executed by the personal computer 1 and the PDA 41. Alternatively, it may be such that the processing described above as executed by the personal computer 1 is executed by the PDA 41 and that the processing described above as executed by the PDA 41 is executed by the personal computer 1.

Figure 14:
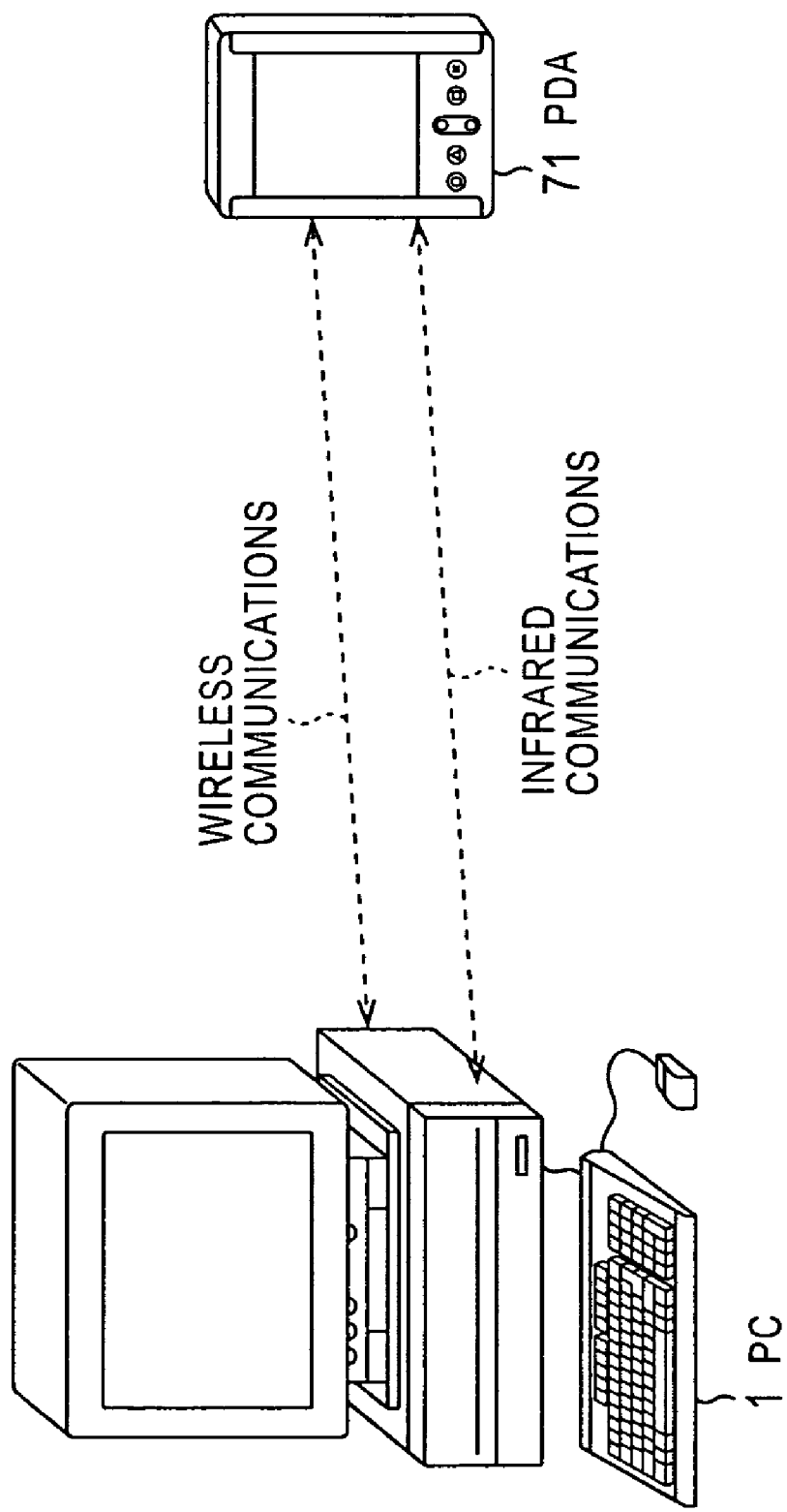
FIG. 14 is a diagram showing a scheme of forming a wireless LAN between the personal computer 1 and a PDA 71 by infrared communication without using the IC card 2.

FIG. 14 shows a scheme of a wireless LAN that is formed between the personal computer 1 and a PDA 71 in ad-hoc mode by infrared communication without using the IC card 2. That is, local-network information is exchanged between the personal computer 1 and the PDA 71 using infrared rays, whereby configuration for wireless communications is set.

Figure 15:
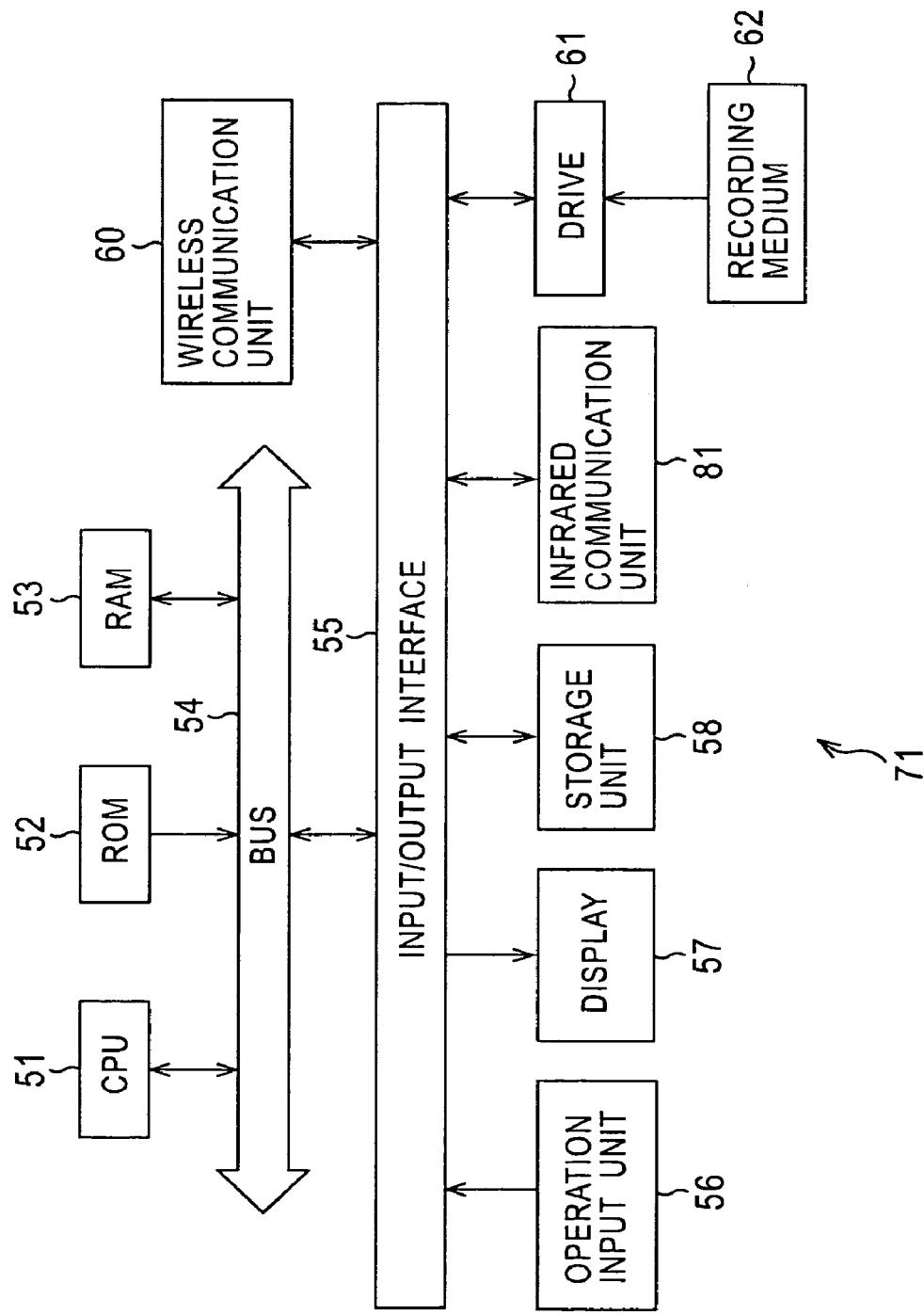
FIG. 15 is a block diagram showing an example configuration of the PDA 71 shown in FIG. 14.

FIG. 15 shows an example configuration of the PDA 71. The PDA 71, as compared with the PDA 41 shown in FIG. 12, includes an infrared communication unit 81 instead of the contactless communication unit 59. The infrared communication unit 81 exchanges local-network information with the infrared communication unit 26 of the personal computer 1 by infrared communication.

The components of the PDA 71 other than the infrared communication unit 81 are denoted by the same numerals as the corresponding components of the PDA 41, and thus descriptions thereof will be omitted.

Processing for forming a wireless LAN in ad-hoc mode by infrared communication without using the IC card 2, executed by the personal computer 1 and the PDA 71, will be described with reference to FIG. 16.

In step S51, the infrared communication unit 26 of the personal computer 1, under the control of the CPU 11 based on an operation performed by the user, enters a mode for sending local-network information by infrared communication.

Meanwhile, the infrared communication unit 81 of the PDA 71, in step S61, under the control of the CPU 51 based on an operation performed by the user, enters a mode for receiving local-network information by infrared communication.

In step S52, the infrared communication unit 26 of the personal computer 1 waits until communication with the infrared communication unit 81 of the PDA 71 is established.

At this time, when the user places the infrared communication unit 81 of the PDA 71 in proximity to and directs it toward the infrared communication unit 26 of the personal computer 1, communication is established between the infrared communication unit 26 and the infrared communication unit 81, and the processing proceeds to step S53.

In step S53, the infrared communication unit 26 sends local-network information required for forming a wireless link with the infrared communication unit 81 of the PDA 71.

In step S62, the infrared communication unit 81 of the PDA 71 receives the local-network information sent by the infrared communication unit 26. In step S63, the CPU 51 sets network configuration of the wireless communication unit 60 according to the local-network information received by the infrared communication unit 81. Thus, a wireless LAN is formed between the personal computer 1 and the PDA 71 in ad-hoc mode.

This concludes description of the processing for forming a wireless LAN by infrared communication without using the IC card 2, executed by the personal computer 1 and the PDA 71. Alternatively, it may be such that the processing described above as executed by the personal computer 1 is executed by the PDA 71 and that the processing described above as executed by the PDA 71 is executed by the personal computer 1.

The present invention can be applied to, without limitation to personal computers and PDAs, any type of electronic apparatuses including, for example, cellular phones, digital video cameras, television receivers, video recorders, microwave ovens, and air conditioners.

Furthermore, although IEEE 802.11b is used as a wireless communication standard in the embodiment, other wireless communication standards including, for example, IEEE 802.11a, IEEE 802.11g, and Bluetooth may be used.

The series of processing steps described above may be executed either by hardware or by software. When the series of processing steps is executed by software, a program constituting the software are installed from a recording medium onto, for example, a computer embedded in special hardware, or a computer such as a general-purpose computer that allows various functions to be executed with various programs installed thereon.

The recording medium may be, for example, as shown in FIG. 2, a package medium such as the magnetic disc 22 to the semiconductor memory 25 having the program recorded thereon, distributed for providing the program to a user separately from the computer. Alternatively, the recording medium may be a ROM, a hard disc, or the like having the program recorded thereon, incorporated in advance in a computer and provided to a user.

In this specification, steps of the program recorded on the recording medium may include, as well as processes executed sequentially in the described order, processes executed in parallel or individually without limitation to processes executed sequentially.

In this specification, a system refers to the entirety of a plurality of apparatuses.

INDUSTRIAL APPLICABILITY

As described above, according to the present invention, setting for forming a wireless link can be automatically executed without requiring a user to perform a special setting operation.

The invention claimed is:

1. A system for establishing wireless communication, comprising:
 a first communication apparatus comprising:
  means for establishing a user name and a password of the first communication apparatus;
  first wireless communication means for establishing wireless communication with a second communication apparatus based on a predetermined wireless standard;
  first detection means for detecting a presence of an information recording medium;
  writing means for writing, by contactless communication based only upon detection of the information recording medium, the user name and the password to the information recording medium, the user name and the password being established for forming wireless communication between the first communication apparatus and the second communication apparatus, wherein the second communication apparatus comprises:
- second wireless communication means for carrying out wireless communication with the first communication apparatus based on the predetermined wireless communication standard;
- second detection means for detecting the presence of the information recording medium;
- reading means for reading, by contactless communication, the user name and the password of the first communication apparatus from the information recording medium; and
- establishing means for establishing the wireless communication with the first communication apparatus according to the user name and the password.

2. A system according to claim 1, wherein the predetermined wireless communication standard is IEEE 802.11b.

3. A system according to claim 1, wherein the predetermined wireless communication standard is Bluetooth wireless communication standard.

4. A system according to claim 1, wherein the contactless communication is carried out using a FeliCa System.

5. A system according to claim 1, wherein the information recording medium is an IC card.

6. A system according to claim 1, wherein the writing means further writes at least one of ID information and a password associated with the ID information to the information recording medium.

7. A communication method for establishing wireless communication between a first communication apparatus and a second communication apparatus based on a predetermined wireless communication standard, the communication method comprising:
- detecting, by the first communication apparatus, a presence of an information recording medium;
- writing, by the first communication apparatus using contactless communication based only upon detection of the information recording medium, a user name and a password of the first communication apparatus to the information recording medium, the user name and the password being established for forming wireless communication between the first communication apparatus and the second communication apparatus;
- detecting, by the second communication apparatus, a presence of the information recording medium;
- reading, by the second communication apparatus using contactless communication, the user name and the password from the information recording medium; and
- establishing, by the second communication apparatus, the wireless communication based on the user name and the password.

8. A recording medium having recorded thereon a computer-readable program which, when executed by a processor, performs a method for establishing wireless communication between a first communication apparatus and a second communication apparatus based on a predetermined wireless communication standard, the method comprising:
- detecting, by the first communication apparatus, a presence of an information recording medium;
- writing, by the first communication apparatus using contactless communication based only upon detection of the information recording medium, a user name and a password of the first communication apparatus to the information recording medium, the user name and the password being established for forming communication between the first communication apparatus and the second communication apparatus;
- detecting, by the second communication apparatus, a presence of the information recording medium;
- reading, by the second communication apparatus using contactless communication, the user name and the password from the information recording medium; and
- establishing, by the second communication apparatus, the wireless communication based on the user name and the password.

* * * * *